United States Patent [19]

Bone

[11] Patent Number: 4,605,349

[45] Date of Patent: Aug. 12, 1986

[54] SPRING CENTERING DEVICE FOR TOOL SPINDLES

[75] Inventor: Kendall F. Bone, Cincinnati, Ohio

[73] Assignee: Cincinnati Milacron Inc., Cincinnati, Ohio

[21] Appl. No.: 689,260

[22] Filed: Jan. 7, 1985

[51] Int. Cl.⁴ ............................................. B23C 5/26
[52] U.S. Cl. .................................. 409/141; 408/143; 408/239 R; 409/233
[58] Field of Search ............... 409/233, 141; 29/26 A, 29/568; 408/239, 239 A, 143

[56] References Cited

U.S. PATENT DOCUMENTS

| | | | |
|---|---|---|---|
| 3,242,819 | 3/1966 | Erikson | 409/233 |
| 4,063,488 | 12/1977 | Kagerer | 409/233 |
| 4,352,612 | 10/1982 | Benatti | 409/233 |
| 4,480,366 | 11/1984 | Takahashi et al. | 29/26 A |

OTHER PUBLICATIONS

"Bellevill Spring Washers Solve Problems of High Loads" bulletin, Associated Spring Corporation, Bristol, Conn., 12/1966.
"SPEC Belleville Spring Washers" catalog No. B-401, Associated Spring Corporation, Bristol, Conn., 8/1968.

*Primary Examiner*—Z. R. Bilinsky
*Attorney, Agent, or Firm*—Thomas M. Farrell

[57] ABSTRACT

An elastomeric sleeve is fitted within a spindle bore over a coaxial spring assembly used to actuate a drawbar clamp. The sleeve takes up the radial clearance space normally provided for the spring assembly, so that as the diameter of the spring assembly changes during compression cycles, the sleeve will be radially compliant and tend to keep the spring assembly centered, thereby minimizing vibrations while the spindle is rotated.

4 Claims, 5 Drawing Figures

SPRING CENTERING DEVICE FOR TOOL SPINDLES

BACKGROUND OF THE INVENTION

The invention is related generally to centering of springs about a common longitudinal axis. In particular, the invention concerns itself with machine tool spindles which employ a central drawbar for securing a tool, where the drawbar is actuated by spring force.

It has long been known in milling machines and other tools to employ a central drawbar within the tool spindle to retain the tool which is inserted in the spindle nose. Earliest machines utilized a threaded drawbar which was inserted through the rear of the spindle and threaded into the tool shank to retain the two together. In automatic machining centers, it is well-known in the art that a drawbar is usually spring applied. That is, the drawbar is fitted with a plurality of springy collet fingers at its front end for grasping a tool stud, and the drawbar is withdrawn into the spindle to retain the stud under the force of a coaxial compression spring, such as a large helical compression spring or a plurality of nested or stacked belleville springs. The spring force in such machining centers generally is in the range of several thousand to ten thousand pounds of clamping force. The drawbar grip is released by a fluid-powered central piston applied at a tool interchange time, wherein the spring force is overcome, thus moving the drawbar to an unclamped position where the springy collet fingers will release the tool stud. The use of spring force is very desirable for tool retention, since the mechanical elements of the assembly will remain locked in the event of a machine power failure.

Several problems are inherent in the assemblies which employ spring applied drawbar clamping forces, however. The spring enlarges at its outer diameter as the spring is compressed, and, in the case of belleville springs in particular, the inner diameter becomes smaller as well. Therefore, to accommodate the diametral changes in the clamping springs, the drawbar must be made with a sufficiently reduced diameter to provide radial clearance around the spring ID, and the spindle must be machined with a clearance hole to provide radial clearance around the outer diameter of the springs. Additionally, it is well-known in the machine arts that helical compression springs will tend to buckle slightly and go off-center as they are worked. Similarly, a stack of belleville springs will tend to slip off the central axis of the drawbar as they are worked against one another, since they are small conical plates arrayed base-to-base, etc.

The movement off-center of the drawbar actuating springs does not usually present a problem in machines which have low rotational spindle speeds but, as spindle speeds are increased, vibrational forces may arise due to the off-centering mass of the springs. Modern day machining centers are being configured for rotational spindle speeds of 10,000 to 40,000 rpm and up. At these greatly increased spindle speeds, the eccentric mass problem of the springs becomes more acute.

Applicant has obviated the difficulties inherent in the state-of-the-art machining centers by providing for a spring centering means which will tend to keep the spring centered about the axis of the drawbar and thereby reduce or eliminate any vibrational problems which the springs may potentially cause.

It is therefore an object of the present invention to provide a device for centering a spring element about its longitudinal axis which comprises an axis of rotation.

SUMMARY OF THE INVENTION

The invention is shown embodied in a rotatable machine spindle having a central drawbar axially movable along the axis of rotation under the influence of a central spring element. The centrality of the spring element about the axis of rotation is maintained by a radially compliant device contacting at least a portion of the outer periphery of the spring mechanism.

DESCRIPTION OF THE PREFERRED EMBODIMENT

Figure 1:
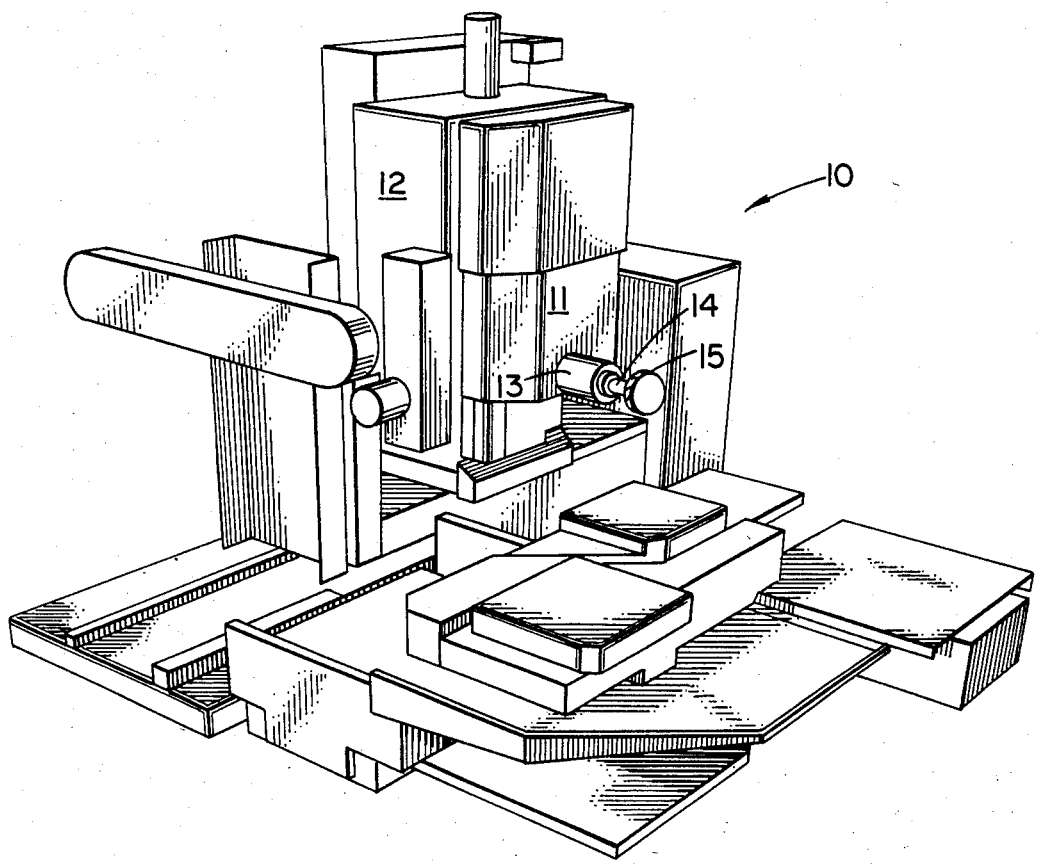
FIG. 1 is a perspective view of a machining center having a rotatable spindle employing the present invention.

Referring to the drawings, FIG. 1 depicts a machining center 10 of the type manufactured by Cincinnati Milacron Inc. the assignee of the present invention. The machining center 10 has a spindle carrier 11 movable on a column 12, and an extended housing portion 13 of the spindle carrier 11 serves to participate in the rotational support of the spindle 14. The spindle 14 is arranged for driving a plurality of tools 15 which may selectively interchanged with one another.

Figure 2:
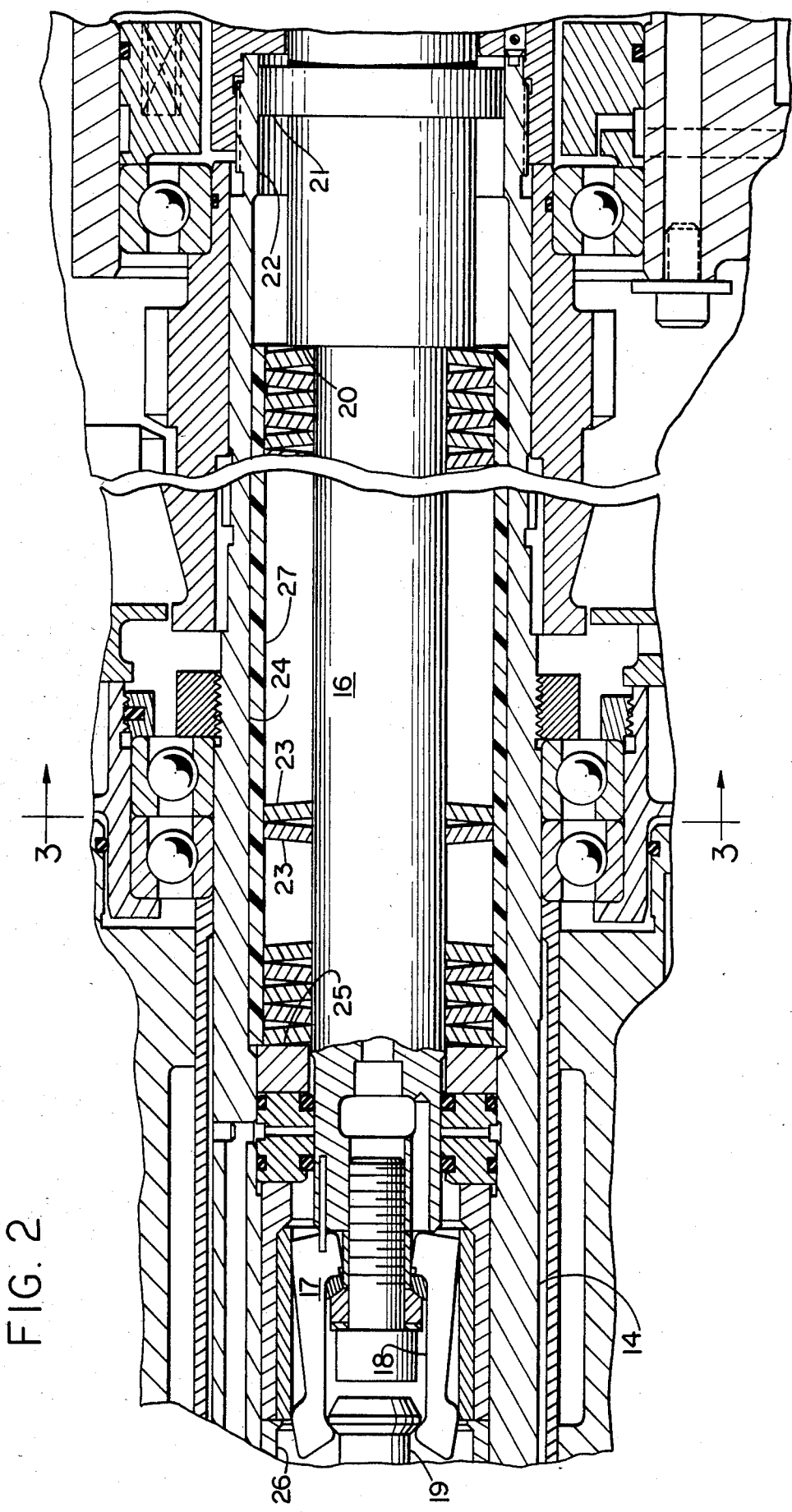
FIG. 2 is an axial section taken through the spindle of FIG. 1.
Figure 3:
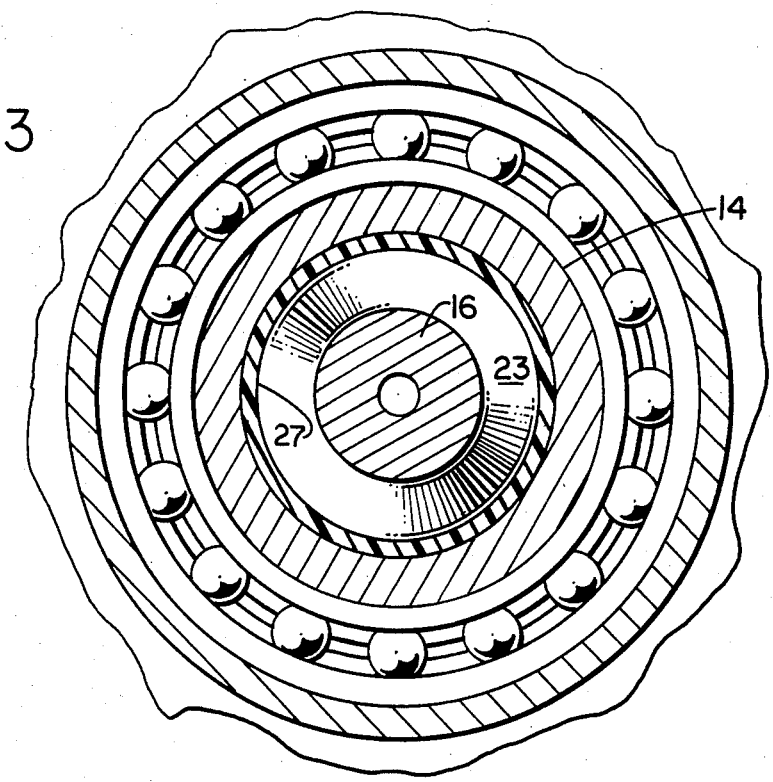
FIG. 3 is a radial section taken through the spindle of FIG. 1 along the line 3—3 of FIG. 2.

The section view of FIG. 2 illustrates that the tool 15 is retained in the spindle 14 by a drawbar mechanism which comprises a central drawbar 16 having an end cap 17 with springy collet fingers 18. The collet fingers 18 move centrally to clamp and retain a tool retention stud 19 affixed to the tool 15 when the drawbar 16 is withdrawn rearwardly into the spindle 14. The rear of the drawbar 16 has an enlarged shoulder 20 and an adjacent integral piston 21 carried in a cylinder 22 formed in the spindle 14. A plurality of back-to-back belleville springs 23 are mounted in a spindle bore 24 and supported against an internal shoulder 25 while reacting against the shoulder 20 of the drawbar 16 to bias the drawbar 16 in a rearward direction, relative to the forward spindle nose (not shown). When it is desired to release the tool 15, the central piston 21 is hydraulically actuated at the rear of the spindle cylinder 22, foring the drawbar 16 forward and thus overcoming the biasing springs 23 and releasing the tool stud 19 by allowing the collet fingers 18 to deflect outwardly into a spindle relief 26.

When the springs 23 are compressed during the release movement the outer diameter of the spring 23 increases, and the inner diameter decreases. Thus, the drawbar 16 must be of smaller diameter than the anticipated reduced diameter of the spring bore. Similarly, the outer diameter of the springs 23 must be provided with a clearance or relief area so that the springs 23 may work properly. In order to accommodate the spring growth of the outer diameter, yet not inhibit the interworking of the belleville springs 23, an elastomeric sleeve 27 is slipped over the spring assembly and encased in the spindle bore 24. The elastomeric sleeve 27 may be formed of any suitable yieldable material, such as urethane, for example. Therefore, as the springs 23 individually grow in diameter, the sleeve 27 will yield yet maintain uniform radial loading around the spring 23 thereby tending to keep it centered on the drawbar axis. As a result, vibrational inaccuracies will tend to be reduced or eliminated since the spring masses will be maintained around the drawbar axis.

Figure 4:
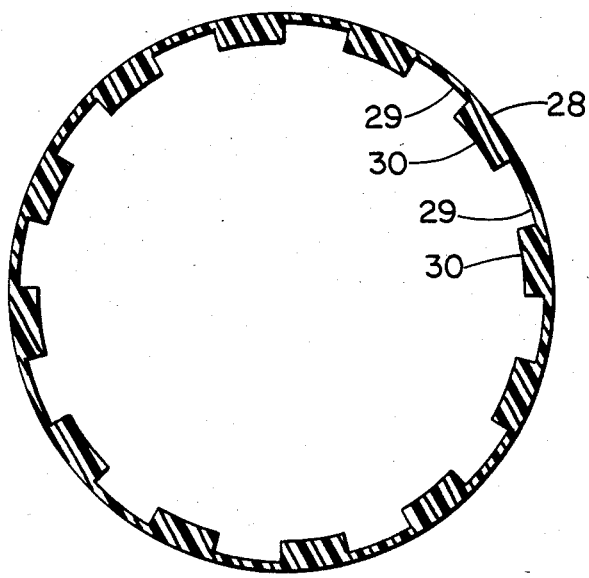
FIG. 4 is an end view of an alternate embodiment of the present invention.

An alternate embodiment is depicted in FIG. 4, wherein the tubular elastomeric sleeve 28 is provided with longitudinal grooves 29 at its inner periphery to create a plurality of circumferential lands 30. When deflected by the springs 23 the elastomeric material may yield into the grooves 28 to facilitate flexing of the elastomeric sleeve 28 while maintaining uniform peripheral load points around the spring periphery to center the spring 23.

Figure 5:
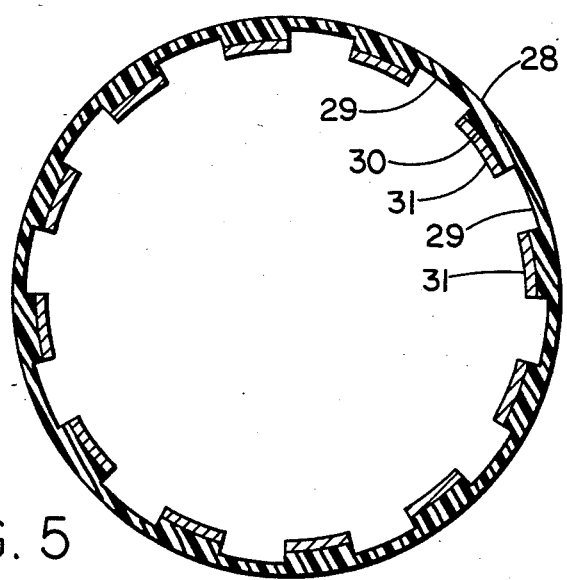
FIG. 5 is an end view of a second alternate embodiment of the present invention.

A second alternate embodiment is depicted in FIG. 5, wherein the tubular elastomeric sleeve 28 is provided with longitudinal grooves 29 at its inner diameter, and the lands 30 are provided with wear strips 31 for their length. The wear strips 31 might typically be formed of metal which is bonded to the urethane sleeve 28. This second alternate embodiment takes into account the fact that many belleville springs 23 are formed of stampings and have rough peripheral surfaces when used in the "as stamped" state. The addition of wear strips 31 to the elastomeric centering sleeve 28 will result in extended life of the sleeve, since frequent machine cycling or heavy loading may tend to cut the elastomeric material.

It may be appreciated by those skilled in the art that the elastomeric element may be substituted around the drawbar 16 at the inner diameter of the belleville spring 23 to center the spring in the manner taught herein.

While the invention has been shown in conjunction with a preferred embodient, it is not intended that the invention be so limited, but rather, the invention extends to all such designs and modifications as come within the scope of the appended claims.

What is claimed is:

1. In a machine having a rotatable tool spindle and a central spring-assisted mechanism utilizing a linear-operating spring, a spring centering device, comprising:
    (a) radially yieldable means coaxially mounted with said spindle for contacting at least a peripheral portion of said linear-operating spring; and
    (b) means for supporting and centering said yieldable means while said yieldable means is in contact with said spring.

2. The spring centering device of claim 1 wherein said radially yieldable means comprises a tubular elastomeric sleeve and said means for supporting and centering comprises a central bore in said spindle.

3. The spring centering device of claim 2, wherein said tubular sleeve has a plurality of longitudinal grooves formed along its inner diameter, creating a plurality of spring-contacting lands.

4. The spring centering device of claim 3 wherein said spring-contacting lands are faced with wear strips.

* * * * *